United States Patent [19]

Smith

[11] Patent Number: 5,425,609

[45] Date of Patent: Jun. 20, 1995

[54] ANCHORING RETAINER FOR THREADED FASTENER

[75] Inventor: Jon D. Smith, Fenton, Mich.

[73] Assignee: Dry Dock Industries, Inc., Fenton, Mich.

[21] Appl. No.: 78,760

[22] Filed: Jun. 16, 1993

Related U.S. Application Data

[63] Continuation of Ser. No. 931,915, Aug. 18, 1992, Pat. No. 5,244,324.

[51] Int. Cl.⁶ .................... F16B 21/00; F16B 13/04
[52] U.S. Cl. ...................................... 411/344; 411/38; 411/60
[58] Field of Search ............... 411/38, 55, 60, 61, 411/340, 342, 344, 345, 913, 34, 37

[56] References Cited

U.S. PATENT DOCUMENTS

| | | |
|---|---|---|
| 4,075,924 | 2/1978 | McSherry et al. . |
| 4,143,581 | 3/1979 | Smith et al. . |
| 4,286,497 | 9/1981 | Shamah . |
| 4,397,595 | 8/1983 | Smith et al. . |
| 4,415,299 | 11/1983 | Smith et al. . |
| 4,422,813 | 12/1983 | Greenbaum . |
| 4,439,079 | 3/1984 | Losada . |
| 4,462,729 | 7/1984 | Uhlig et al. ...................... 411/344 X |
| 4,491,447 | 1/1985 | Smith et al. . |
| 4,650,386 | 3/1987 | McSherry et al. . |
| 4,662,808 | 5/1987 | Camilleri . |
| 4,828,439 | 5/1989 | Giannuzzi ........................ 411/38 X |
| 4,893,973 | 1/1990 | Herb . |
| 4,943,253 | 7/1990 | Smith . |
| 4,984,946 | 1/1991 | Phillips, II . |
| 5,002,445 | 3/1991 | Fischer . |
| 5,006,027 | 4/1991 | Smith . |

*Primary Examiner*—Neill R. Wilson
*Attorney, Agent, or Firm*—Howard & Howard

[57] ABSTRACT

A number of improvements to anchoring retainers are disclosed. The improvements ensure that the retainers are securely attached to walls, and that they do not move during attachment after being attached by a threaded fastener.

20 Claims, 6 Drawing Sheets

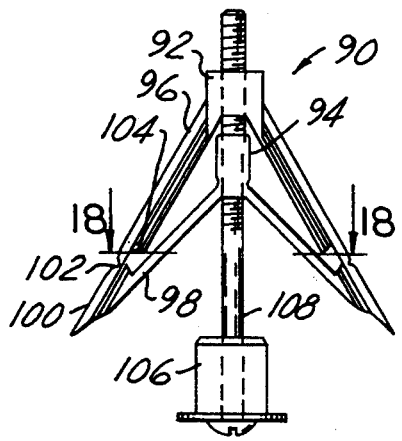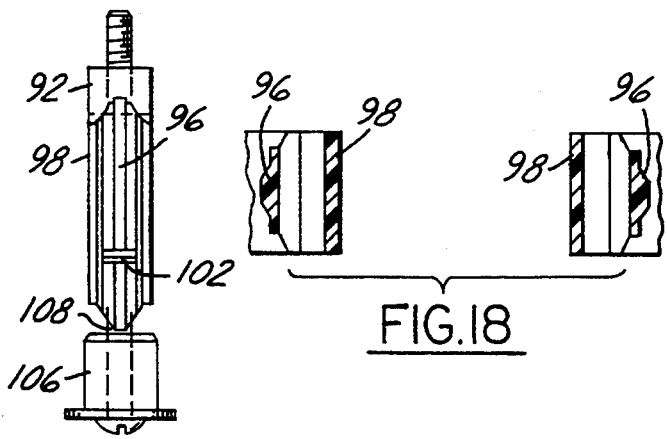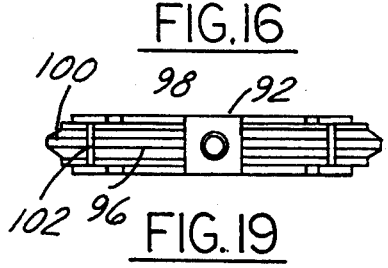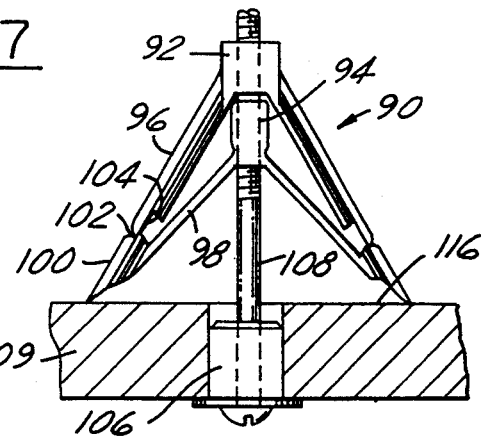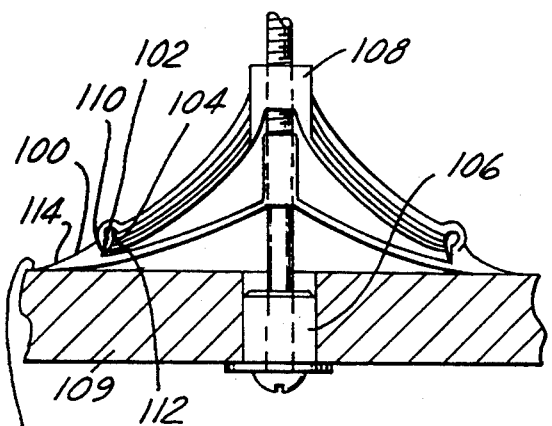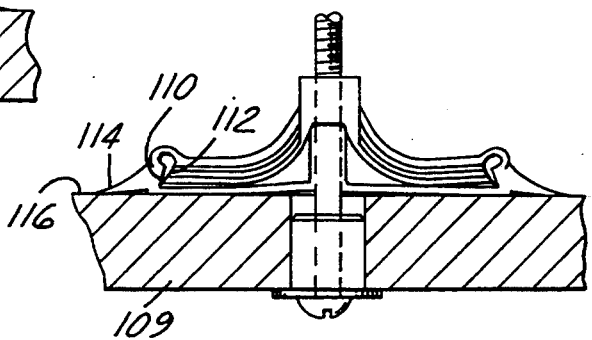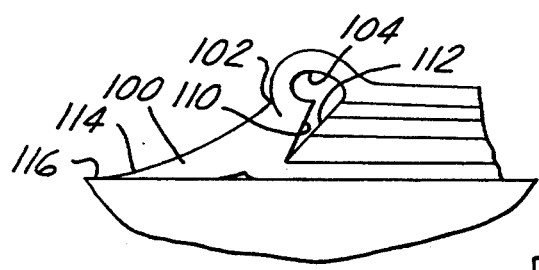

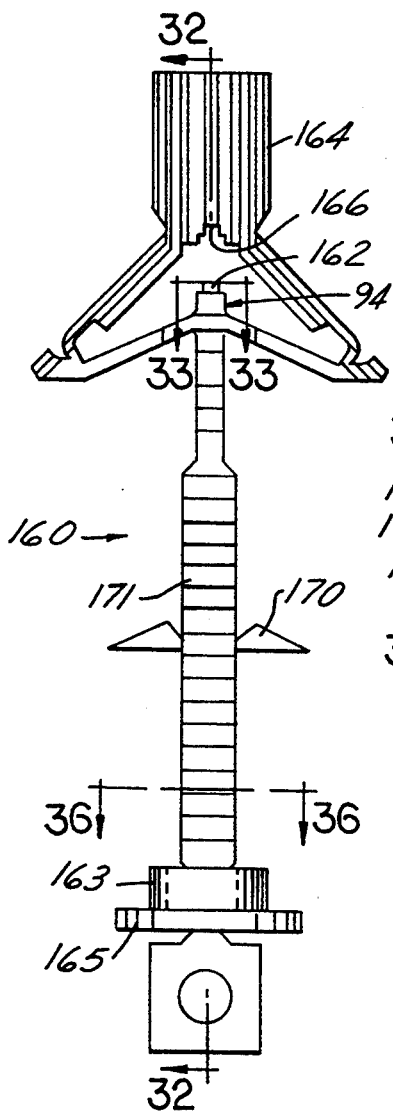
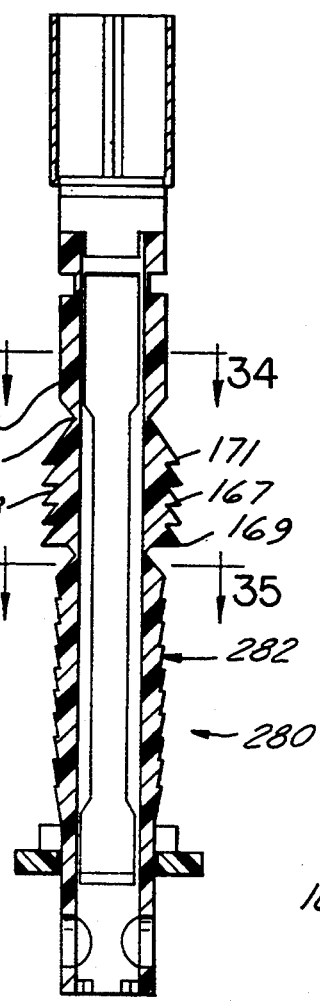
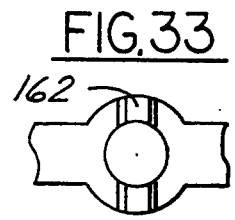
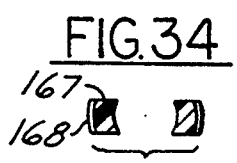
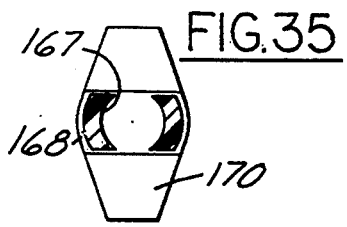
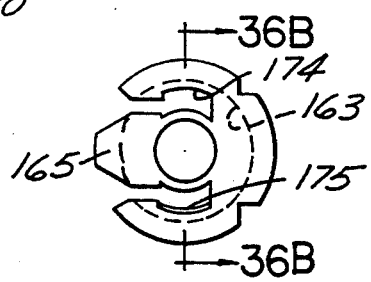
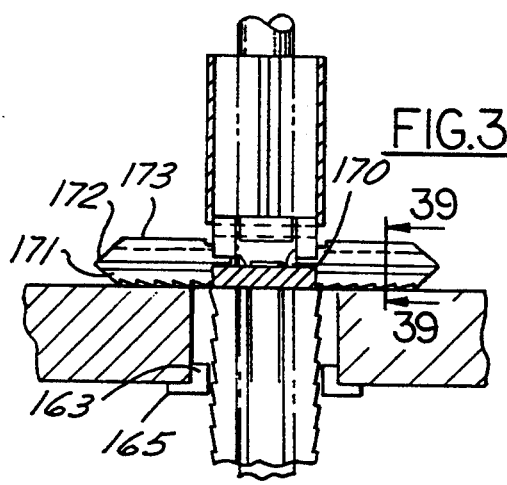
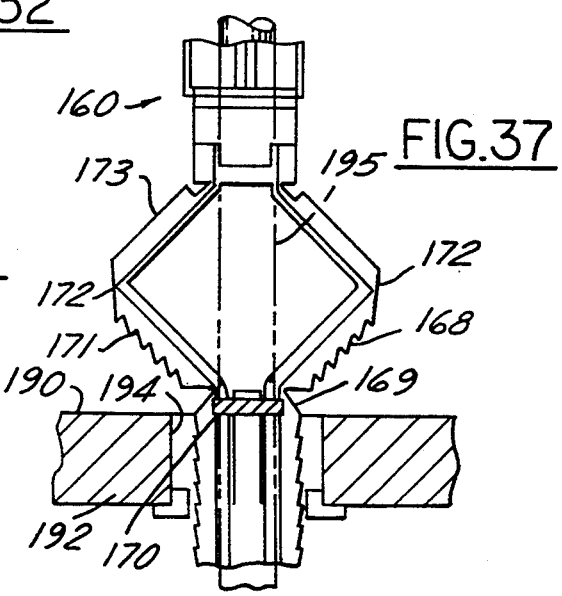

ANCHORING RETAINER FOR THREADED FASTENER

This is a continuation of application Ser. No. 07/931,915 filed Aug. 18, 1992 now U.S. Pat. No. 5,244,324.

BACKGROUND OF THE INVENTION

This application in general relates to several unique anchoring retainers for use with threaded fasteners that incorporate improvements over the prior art.

In the prior art, anchoring retainers are used to hold a threaded fastener such as a bolt or screw in a wall. One known type of anchoring retainer can be used in either a blind hole in a solid wall, or alternatively may be used in a thin wall, such as a drywall wall, where the threaded fastener extends entirely through the wall.

It is desirable to improve upon the prior art anchoring retainers to ensure that they securely retain the threaded fastener within the wall. To this end, it is desirable to optimize the structure of the anchoring retainer such that it locks in place on the wall at a desired position which provides the strongest connection. Further, it is an object of the present invention to develop an anchoring retainer which is easily utilizable.

SUMMARY OF THE INVENTION

The present invention discloses several distinct concepts, all of which improve upon known anchoring retainers.

In a first concept, a pedestal portion is connected to radially outwardly extending arms, which are in turn connected to radially inwardly extending arms, which are connected to a base. A threaded fastener extends freely through the pedestal, and is threadably received in the base. As the threaded fastener is tightened into a wall, it draws the base towards the pedestal, compressing the radially outwardly and radially inwardly extending arms along the wall. In a disclosed embodiment of this invention, a mating lock tab and groove are formed on the base and pedestal, such that the two lock together at a desired location. In features of this invention, the tab may be formed on either the base or pedestal, and may extend entirely across the members, or may only be formed on half of the members.

In another feature of the present invention, a cap member is integrally connected to radially outwardly extending arms, which are connected to radially inwardly extending arms, which are connected to a base. The base threadably receives a threaded fastener. The cap is received within a hole in the wall, and acts to properly position the arms and base relative to the wall.

In a further feature of the present invention, a pedestal base and arm structure as generally described above has recesses and grooves at the connection between the radially inwardly and radially outwardly extending arms. The recesses and grooves control the deformation of the arms as the threaded fastener is tightened within the wall. Due to the structure of the grooves, the arms are forced into contact with an inner surface of the wall, securely retaining the anchoring retainer on the wall.

In a further feature of the present invention, inner and outer arms as generally described above are formed with ramped surfaces which mate with ramped surfaces on an opposed one of the inner and outer arms to ensure that the two do not slide laterally relative to each other as they are tightened. This prevents the anchoring retainer from moving away from a desired position as the fastener is tightened.

In another embodiment of the present invention, an anchoring retainer is disclosed, wherein a head of the retainer is connected to a pedestal portion by elongated strips. The strips extend through a hole in the wall, and are connected to a pair of radially outwardly extending arms, which are connected to radially inwardly extending arms, which are in turn connected to a threaded base. In a preferred embodiment of the present invention, the strips are provided with a plurality of weakened points, such that they can accordion fold as the threaded fastener is tightened in the base.

In another feature of this invention, a cap slides axially along the strips on serrated teeth to close a hole in a wall. The cap is formed with a groove which engages the serrated teeth. The groove is formed in a thickened portion of the cap. This increases the strength of the cap, and allows the cap to be thinner at a surface that will be on an outer surface of the wall.

In yet another feature of the present invention, a base member is formed with two hinged flip caps which are forced radially outwardly by passage of a threaded fastener through the base. With this construction, the previously discussed arms secure the anchoring retainer to the wall when the retainer is used with a thin wall. Alternatively, when this anchoring retainer is used in a blind hole, these hinged flip caps are forced radially outwardly and engage the inner surface of the hole, securing the anchoring retainer within the hole.

These and other features of the present invention can be best understood from the following specification and drawings, of which the following is a brief description.

BRIEF DESCRIPTION OF THE DRAWINGS

FIG. 16 shows yet another alternative retainer.

FIG. 17 is a side view of the retainer shown in FIG. 16.

FIG. 18 is a cross-sectional view along line 18—18 as shown in FIG. 16.

FIG. 19 is an end view of the retainer shown in FIG. 16.

FIG. 20A shows the first step in attaching the anchoring retainer shown in FIG. 16 to a wall.

FIG. 20B shows a subsequent step in the attachment of the retainer shown in FIG. 16 to a wall.

FIG. 21 shows the final position of the retainer shown in FIG. 16 secured to a wall.

FIG. 22 is an enlarged portion of the retainer shown in FIG. 21.

FIG. 31 shows yet another alternative retainer according to the present invention.

FIG. 32 is a cross-sectional view along line 32—32 as shown in FIG. 31.

FIG. 33 is a cross-sectional view along line 33—33 as shown in FIG. 31.

FIG. 34 is a cross-sectional view along line 34—34 as shown in FIG. 32.

FIG. 35 is a cross-sectional view along line 35—35 as shown in FIG. 32.

FIG. 36A shows a cap incorporated into the retainer embodiment illustrated in FIG. 31.

FIG. 37 shows an initial connection of the anchoring retainer shown in FIG. 31 to a wall.

FIG. 38 shows the final configuration of the retainer after it has been attached to the wall.

DETAILED DESCRIPTION OF A PREFERRED EMBODIMENT

Figure 1:
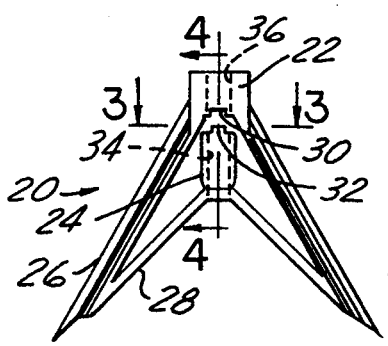
FIG. 1 is a side view of a first embodiment anchoring retainer.
Figure 2:
FIG. 2 is a side view of the retainer shown in FIG. 1.

A first embodiment anchor, or anchoring retainer 20 is illustrated in FIG. 1 having a base 22 spaced from a pedestal 24. Both pedestal 24 and base 22 are formed with a bore for passage of a threaded retainer, however, base 22 has a threaded bore 36 and moves on the thread of the threaded retainer, which passes freely through bore 34 in pedestal 24.

A pair of radially outwardly extending arms 26 extend radially outwardly from base 22, and are connected to a pair of radially inwardly extending arms 28, which are connected to pedestal 24. A lock groove 30 is formed in base 22, and cooperates with a lock tab 32 on pedestal 24 to lock the pedestal 24 and base 22 at a desired location as a threaded fastener is tightened within retainer 20. As shown in FIGS. 1-5, retainer 20 has radially outer arms 26 and radially inner arms 28.

Figure 3:
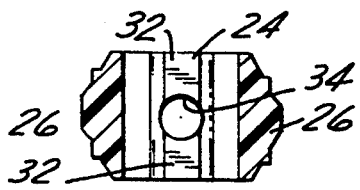
FIG. 3 is a view along line 3—3 as shown in FIG. 1.
Figure 4:
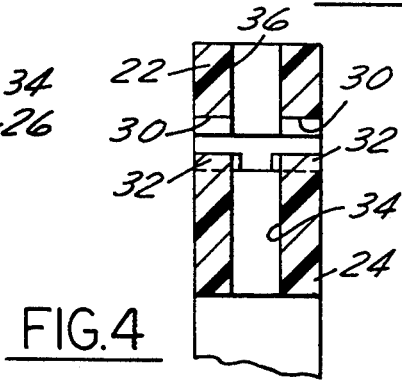
FIG. 4 is a view along line 4—4 as shown in FIG. 1.

As shown in FIG. 3, lock tabs 32 are formed at two separate locations spaced on each side of a bore 34 in pedestal 24 which allows passage of the threaded retainer. As shown in FIG. 4, groove 30 is also found on both sides of threaded bore 36.

Figures 1A, 5:
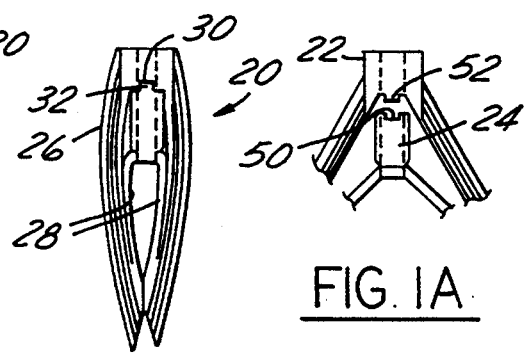
FIG. 1A is an enlarged portion of a second embodiment of the retainer shown in FIG. 1.
FIG. 5 is a view of the retainer shown in FIG. 1 flexed to an insertion position.
Figure 6:
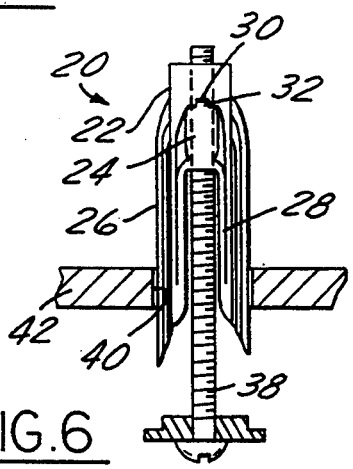
FIG. 6 is a view of the retainer shown in FIG. 1 being inserted through a thin wall.

As shown in FIG. 5, when it is desired to insert anchoring fastener 20 into a wall, arms 26 and 28 may be flexed radially inwardly to the position shown in FIG. 5. As shown in FIG. 6, a threaded retainer 38 is typically inserted through anchor 20 prior to being inserted within an aperture 40 formed in a thin wall 42.

Figure 7:
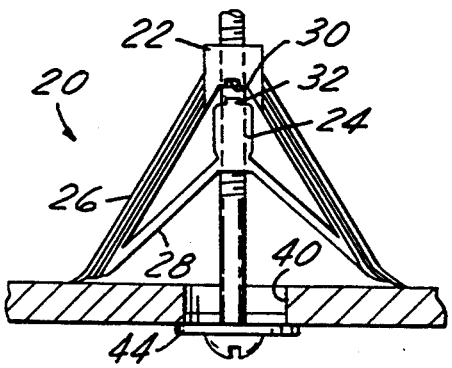
FIG. 7 is a view of the retainer shown in FIG. 6, during a first step of inserting the retainer into a wall.
Figure 8:
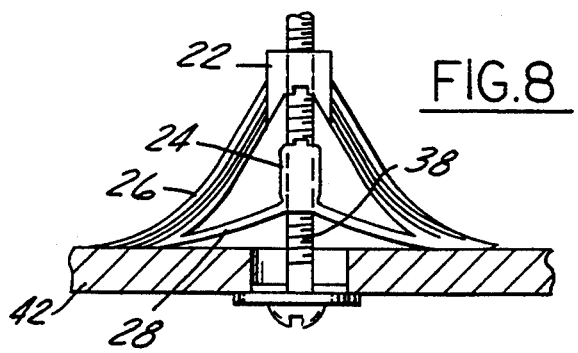
FIG. 8 shows a subsequent step to that shown in FIG. 7.

As shown in FIG. 7, in a thin wall application, once the outer portion of arms 26 and 28 pass through aperture 40, they spring radially outwardly towards their relaxed position. At this time, threaded retainer 38 is threadably received within base 22, and slidably received within bore 34 in pedestal 24. As shown in FIG. 8, threaded retainer 38 is tightened and base 22 is drawn towards wall 42.

Figure 9:
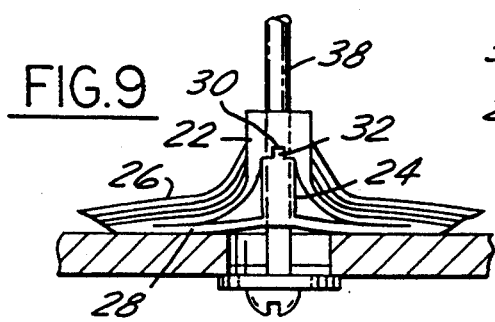
FIG. 9 shows the final position of the retainer shown in FIG. 1.

As shown in FIG. 9, base 22 eventually contacts pedestal 24, and forces it downwardly towards wall 42. At that time, lock tab 32 will be received within lock groove 30 ensuring that base 22 and pedestal 24 remain at desired positions holding retainer 20 securely on wall 42.

FIG. 1A shows an alternative embodiment with a lock groove 50 formed in pedestal 24 and a lock tab 52 formed in base 22.

Figures 1B, 1C:
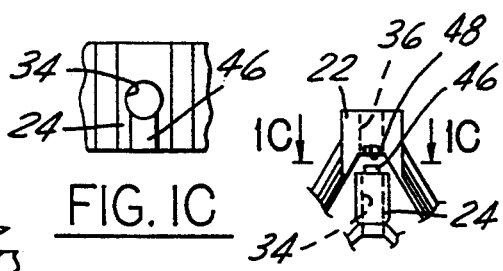
FIG. 1B is a view of a third embodiment similar to that shown in FIG. 1A.
FIG. 1C is a view along line 1C—1C as shown in FIG. 1B.

FIG. 1B shows yet another alternative embodiment, wherein lock tab 46 is only found on one lateral side of the bore 34 in pedestal 24. Similarly, lock groove 48 is only formed on one lateral side of bore 36 in base 22. This is most clearly shown in FIG. 1C.

Figure 10:
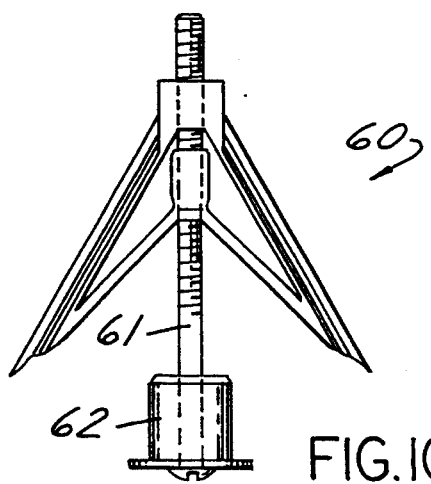
FIG. 10 shows an alternative retainer.
Figure 11:
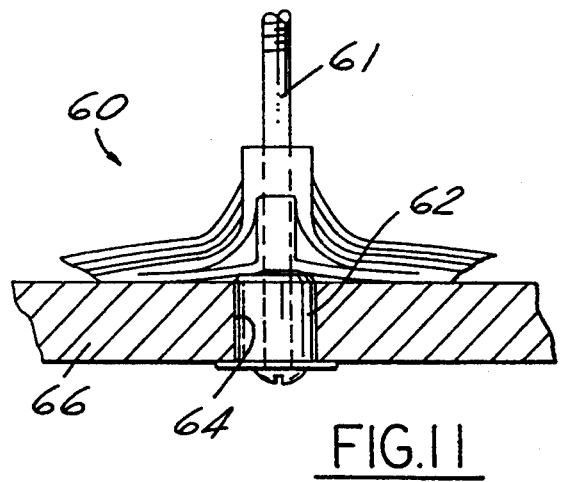
FIG. 11 shows the retainer shown in FIG. 10 attached to a wall.

Another embodiment retainer 60 is shown in FIG. 10, having a cap 62 which is to be received within an aperture to secure threaded retainer 61 to a wall. As shown in FIG. 11, cap 62 extends through an aperture 64 in wall 66, and retainer 60 adjusts along bolt 61, in a similar fashion to the retainer described above.

Figure 12:
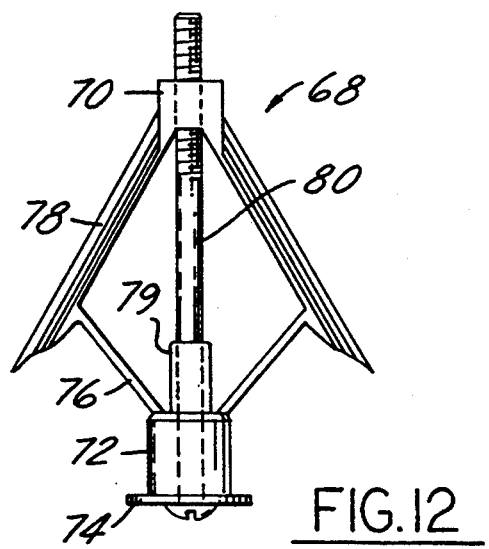
FIG. 12 shows yet another alternative retainer.
Figure 13:
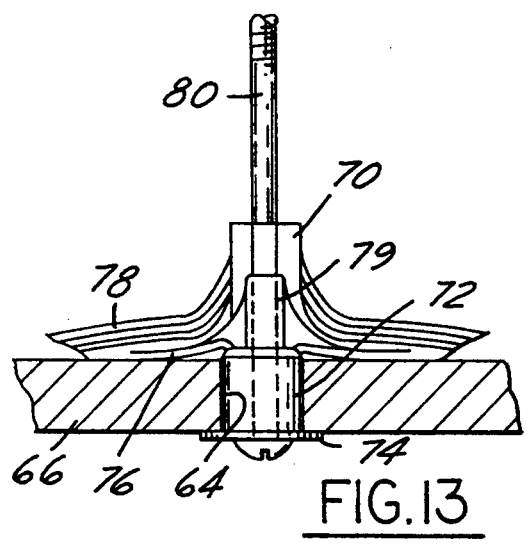
FIG. 13 shows the retainer shown in FIG. 12 secured to a wall.

As shown in FIG. 12, another embodiment retainer 68 includes a base 70 which is connected to a cap 72 having a lip 74 which will abut an outer surface of an aperture 74. Arms 76 and 80 connect cap 72 to base 70. A member 79 extends inwardly from cap 72 and functions similar to the pedestals in the previous embodiment. A threaded retainer 80 is threadably received within base 70. As shown in FIG. 13, when fully connected, base 70 abuts pedestal 79, with the integral cap 72 received within aperture 64. When moving to the fully connected position legs 76 fold outwardly.

Figure 14:
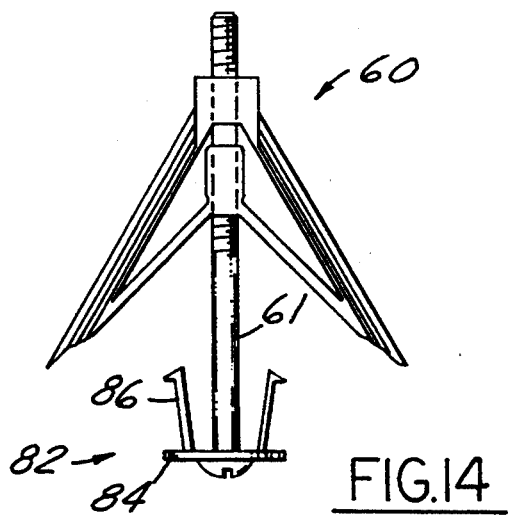
FIG. 14 shows yet another alternative retainer.
Figure 15:
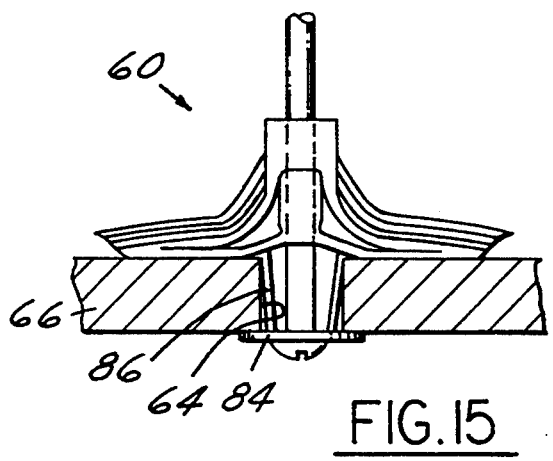
FIG. 15 shows the retainer shown in FIG. 14 secured to a wall.

FIG. 14 shows yet another embodiment retainer cap 82. Cap 82 has a lip 84 with fingers 86 extending inwardly. As shown in FIG. 15, lip 84 is received outwardly of aperture 64 with fingers 86 locked to an inner face of wall 66.

Another embodiment anchor 90 is illustrated in FIG. 16. A base 92 is connected to a pedestal 94 through a radially outwardly extending arm 96 and a radially inwardly extending arm 98. Arms 96 and 98 are connected at a joint 100 which includes a recess 102 and a hinge 104. A cap 106 is received on the threaded retainer 108. As shown in FIG. 17, recess 102 is formed only on radially outer arms 96, and not on radially inner arm 98. FIG. 18 shows further features of arms 96 and 98. FIG. 19 shows recess 102 on arms 96 and 98.

As shown in FIG. 20A, when retainer 90 is received on threaded retainer 108, joint 100 abuts an inner face 116 of thin wall 109.

As shown in FIG. 20B, as the threaded retainer 108 is tightened, the arms begin to pivot about recess 102 and hinge 104. A ramped surface 110 cooperates with a mating ramped surface 112 formed on radially outer arm 96 to bias an outer tip 114 of joint 100 against inner face 116 of wall 109. This firmly secures retainer 90 on wall 109.

As shown in FIG. 21, when fully tightened, ramped surface 112 has forced ramped surface 110 to pivot outwardly such that outer tip 114 is biased onto inner face 116. This is most clearly shown in FIG. 22, which shows the ramped surfaces 110 and 112.

Figure 23:
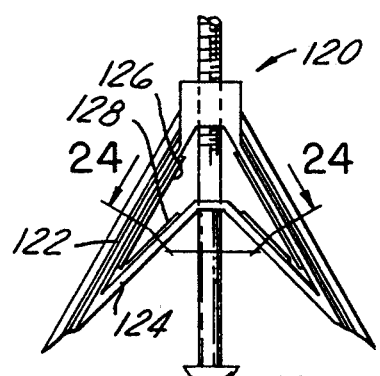
FIG. 23 shows yet another alternative retainer according to the present invention.

FIG. 23 shows yet another embodiment anchor 120 incorporating outer arms 122 and inner arm 124. Outer arm 122 is formed with a latch surface 126, while inner arm 124 is formed with a cooperating latch surface 128.

Figure 24:
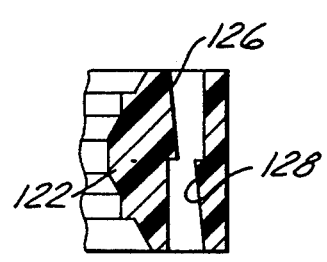
FIG. 24 is a cross-sectional view along line 24—24 as shown in FIG. 23.

As shown in FIG. 24, surfaces 126 and 128 have opposed cliff-like flanges which causes arms 122 and 124 to be locked against relative lateral movement.

Figure 25:
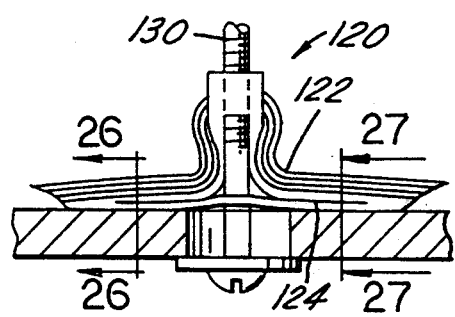
FIG. 25 shows the retainer shown in FIG. 23 secured to a wall.
Figure 26:
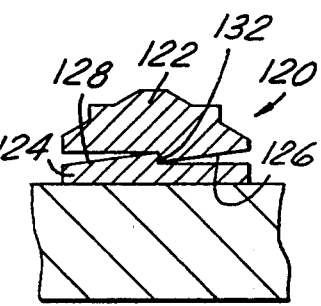
FIG. 26 is a cross-sectional view along line 26—26 as shown in FIG. 25.
Figure 27:
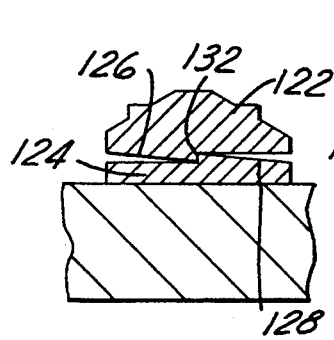
FIG. 27 is a cross-sectional view along line 27—27 as shown in FIG. 25.

As shown in FIG. 25, when retainer 120 is tightened, outer arms 122 lie on inner arms 124. As shown in FIGS. 26 and 27, in this position, cliff-like flanges on surfaces 126 and 128 abut to prevent relative lateral sliding movement of arms 122 and 124. This ensures the retainer 120 is firmly secured to a wall. Further, the surfaces 126 and 128 are ramped to apply a perpendicular force to the outer end of arms 122 and 124 against the wall. The angles of surfaces 126 and 128 may be varied to control this force.

Figure 28:
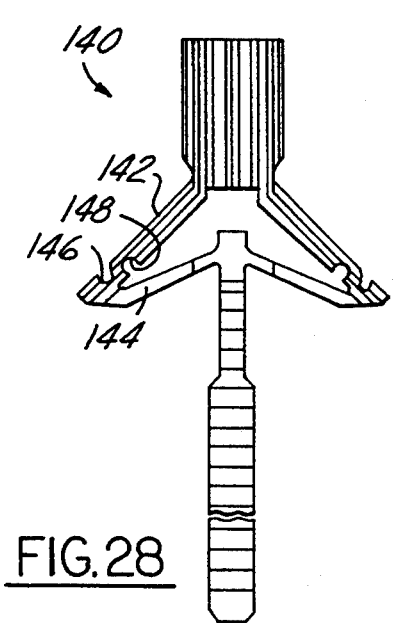
FIG. 28 shows yet another alternative retainer according to the present invention.

Another embodiment retainer 140 is illustrated in FIG. 28. Arms 142 are connected to inner arms 144 at a pair of hinges 146 and 148. A cap head 149 is formed with an aperture 150 to receive a tool for insertion of the retainer 140.

Figure 29:
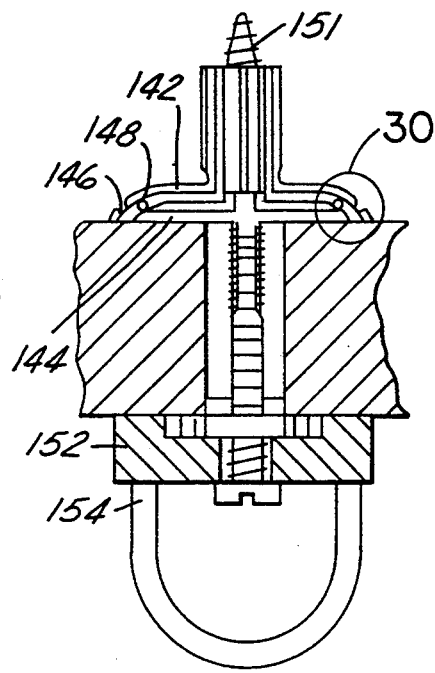
FIG. 29 shows the retainer illustrated in FIG. 28 secured to a wall.

As shown in FIG. 29, retainer 140 can be used to secure a head 152 and a hook 154. Although this is disclosed, other types of members can be connected to threaded fastener 151 used with this embodiment. As shown, outer arm 142 is received on inner arm 146, inner hinge 148 deforms into a circular shape while the outer hinge 146 allows this movement.

Figure 30:
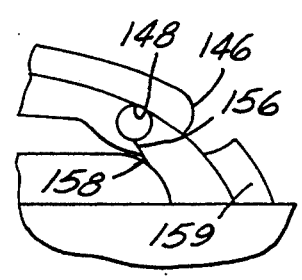
FIG. 30 is an enlarged view of the portion identified by circle 30 in FIG. 29.

As shown in FIG. 30, when in this position mating ramp surfaces 156 and 158 adjacent inner hinge 148 cause an outer tip 159 of retainer 140 to be biased against a wall, similar to the previously disclosed embodiment in FIGS. 16–22.

FIG. 31 discloses yet another retainer 160 incorporating a lock tab 162 and base 164 with a lock groove 166. A cap 165 is secured on elongated strips 171, and is to be received within a hole in a wall. Cap 165 has a thicker portion 163 which is axially received within the hole in the wall. Lips 170 serve a function to be described below.

As shown in FIG. 32, strip portion 167 has a plurality of serrations 168 which help secure the strip to the wall. Strip portion 280 has serrations 282 which extend in the opposed direction from serrations 168, and which engage in grooves in cap 165. A hinge joint 169 is formed adjacent above lips 170, see FIG. 31. A segment 171 of strips 167 is formed between hinge joint 169 and a second hinge joint 172. A second segment 173 of strip 167 is formed on the other side of second hinge joint 172.

As shown in FIG. 33, tab 162 can be formed across the entire width of the retainer. As shown in FIGS. 34 and 35, strips 167 have curved inner surfaces to conform to the shape of a threaded fastener.

Figure 36B:
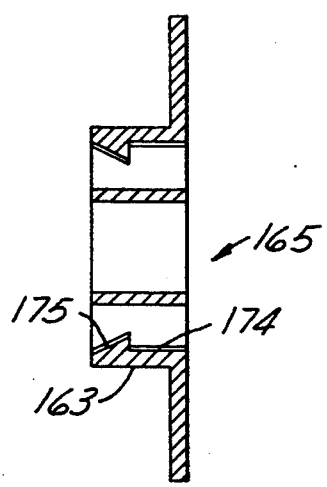
FIG. 36B is a cross-sectional along line 36B—36B as shown in FIG. 36A.

As shown in FIGS. 36A and 36B, cap 165 has a greater thickness portion 163. Grooves 174 having teeth 175 are formed within greater thickness portion 163 and engage the serrations 282 formed on the outer surfaces of strips portions 280. Cap 165 can be adjusted downwardly on strip portions 280 such that they snugly engage an outer surface of a hole. The portion of strip portions 280 outwardly of cap 165 and the hole in the wall, are then removed. The basic adjustment of the cap on the strip is known in the prior art. Since the grooves 174 are formed in the thicker portion 163, the thinner portion 165, which is typically received outwardly of the hole, may be made smaller or thinner, while still providing adequate strength for gripping serrations 282. This improves the appearance of the wall which receives retainer 160, and provides a closer mounting surface.

As shown in FIG. 37, lips 170 initially abut an inner face 190 of a wall 192, after retainer 160 is inserted through an aperture 194 and a fastener 195 is tightened. As lips 170 engage inner face 190, segment 171 begins to bend laterally outwardly about hinge joint 170. At the same time, segment 173 bends back laterally inwardly about hinge joint 172.

As shown in FIG. 38, eventually, segment 173 lies on segment 171. Cap 165 is received within hole 194, with thicker portion 163 received entirely within hole 194. The thinner portion of cap 165 that remains outwardly of hole 194 may thus be made thinner, and thus be less visible.

Figure 39:
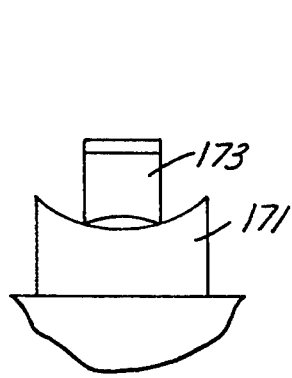
FIG. 39 is a cross-sectional view along line 39—39 as shown in FIG. 38.

As shown in FIG. 39, the mating surfaces of segments 173 and 171 are curved, since they are actually portions of strips 167, which provides a channel or lock to hold segment 173 within segment 171.

Figure 40:
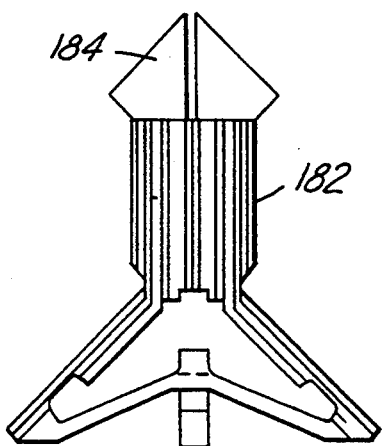
FIG. 40 shows yet another alternative retainer according to the present invention.
Figure 41:
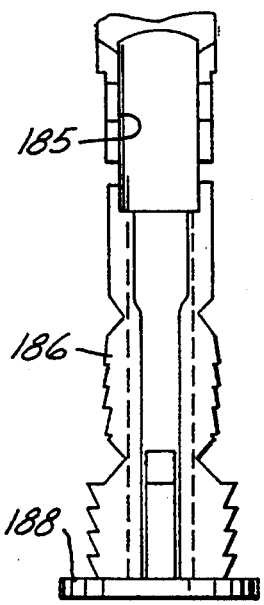
FIG. 41 is a cross-sectional view through the retainer shown in FIG. 40.

As shown in FIG. 40, yet another anchor embodiment retainer 180 includes a base 182 having hinged flip caps 184. Strips 186 and a cap 188 may also be included, although they are not necessary to this invention. Strips 186 and cap 188 are shown in section in FIG. 41 with threaded bore 185 to receive a threaded fastener.

Flip caps 184 extend over the bore 185 through base 182, such that a threaded fastener that extends through bore 185 will contact flip caps 184.

Figure 42:
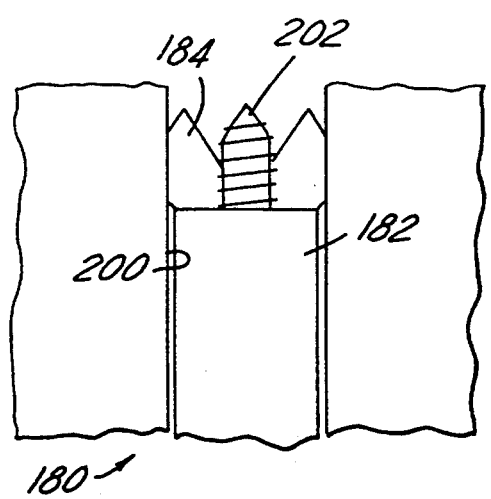
FIG. 42 shows the use of the retainer illustrated in FIG. 40 in a blind hole.

As shown in FIG. 42, when retainer 180 is inserted in a blind hole 200, and a threaded fastener 202 is threaded within base 182, flip caps 184 are forced radially outwardly. In this way, they engage the surface of hole 200, firmly securing retainer 180 within hole 200.

Figure 43:
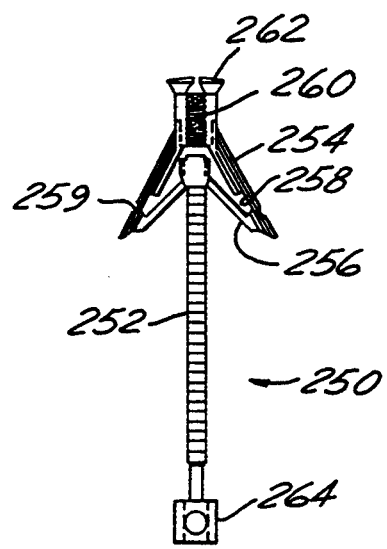
FIG. 43 shows a most preferred retainer embodiment.

As shown in FIG. 43, a most preferred retainer embodiment 250 is to be utilized with cap 165, see FIGS. 36A and 36B. Strips 252 extend toward a retainer portion having radially outwardly extending arms 254 connected to radially inwardly extending arms 256. Grooves 258 and a notch 259 assist the securement of the retainer to a wall, as having been described above. A head 260 has threads at its interior peripheral surface, and flip caps 262. Preferably, two flip caps 262 are utilized, although four or other amounts may be used. A outer portion 264 is to be utilized with a tool to insert retainer, as is known in the prior art. The cap, such as cap 165 is moved along strips 252, to fully secure retainer 250 to a wall.

All of the disclosed retainers and caps are preferably molded from suitable plastics. Several preferred embodiments of this invention have been disclosed. A worker of ordinary skill in the art would recognize, however, that certain modifications would come within the scope of these inventions. For that reason the following claims should be studied in order to determine the true scope and content of the various inventions.

I claim:
1. An anchoring retainer comprising:
   a base at a first axial and, said base having a threaded bore to receive a threaded fastener;
   a member spaced axially from said base, said member having a bore for sliding on a threaded fastener, and at least a pair of arms, one inner arm and one outer arm, connecting said base and said member;
   there being means to assist in the bending movement of said arms to secure said retainer to a wall;
   said outer arm extending radially outwardly from said base and connected to a portion of said inner arm at a joint, said inner arm portion extending radially inwardly to said member; and
   at least one relief formed in the inner surface of said outer arm to control the bending movement of said radially outer and inner arms, and said outer and inner arms being in abutting contact in a fully assembled position, and said relief assisting in folding movement of said outer and inner arms to said abutting contact position.

2. An anchoring retainer as recited in claim 1, wherein said inner relief will control the action of the retainer, when folding and during loading, and also during the fully assembled position.

3. An anchoring retainer as recited in claim 1, wherein the inner relief will control movement from said abutting contact between said radially outer and inner arms to create a biasing force biasing a radially outer portion of said outer arm against a wall receiving said anchoring retainer to apply a tip pressure against the wall.

4. An anchoring retainer comprising:
   a base at a first axial end, said base having a threaded bore to receive a threaded fastener;
   a member spaced axially from said base, said member having a bore for sliding on a threaded fastener, and at least a pair of arms, one inner arm and one outer arm, connecting said base and said member;
   there being means to assist in the bending movement of said arms to secure said retainer to a wall;
   said outer arm extending radially outwardly from said base and connected to a portion of said inner arm at a joint, said inner arm portion extending radially inwardly to said member; and
   at least one relief formed in the inner surface of said outer arm constructed to provide at least two ramped surfaces that will abut each other to control said radially outer and inner arms.

5. An anchoring retainer as recited in claim 4, wherein the inner relief with the abutting ramped surfaces in the outer arm controls the action of the retainer.

6. An anchoring retainer as recited in claim 4, wherein the angles of the abutting ramped surfaces control the action of the retainer.

7. An anchoring retainer as recited in claim 6, wherein said angles can vary.

8. An anchoring retainer as recited in claim 4, wherein changes in said relief can control shape and dimension of the retainer.

9. An anchoring retainer as recited in claim 4, wherein the inner relief with the ramped surface in said outer arm will control the action of the joint to forcibly apply the tip pressure against the wall.

10. An anchoring retainer comprising:
    a base at a first axial end, said base having a threaded bore to receive a threaded fastener;
    a member spaced axially from said base, said member having a bore for sliding on a threaded fastener, and a pair of inner arms and a pair of outer arms connecting said base and said member;
    said outer arms extending radially outwardly from said base and are connected to a portion of said inner arms at joints, said second arm portions extending radially inwardly to said member;
    and there being a locking mechanism interposed between each of said inner and outer arms to interlock said arm members.

11. An anchoring retainer as recited in claim 10, wherein the locking mechanism controls the movement of the retainer.

12. An anchoring retainer as recited in claim 10, wherein the locking mechanism redirects the movement of the retainer.

13. An anchoring retainer as recited in claim 10, wherein the locking mechanism assist in controlling the torque applied to the retainer body.

14. An anchoring retainer as recited in claim 10, wherein the locking mechanism will redirect the torque applied to the retainer body.

15. An anchoring retainer as recited in claim 10, wherein the mating surface of each outer arm is a stepped ramped surface, that will interlock with an opposing, mating stepped ramped surface of the corresponding inner arm, to control the action or torque on or within the retainer body.

16. An anchoring retainer as recited in claim 10, wherein the mating surface of each outer arm is a stepped ramped surface, that will interlock with an opposing, mating stepped ramped surface of the corresponding inner arm, to redirect the action or torque on or within the retainer body.

17. An anchoring retainer comprising:
    a base at a first axial end, said base having a threaded bore to receive a threaded fastener;
    a member spaced axially from said base, said member having a bore for sliding on a threaded fastener and a pair of inner arms and a pair of outer arms connecting said base and said member;
    said outer arms extending radially outwardly from said base and are connected to portions of said inner arms at joints, said second arm portions extending radially inwardly to said member;
    there being a locking mechanism interposed between each of said inner and outer arms to interlock said arm members wherein the mating surfaces of the outer arms are stepped ramped surfaces that will interlock with opposing stepped ramped arms mating surfaces on the inner arms to control the action or torque on or within the retainer body; and
    said stepped ramped mating surfaces function along the centerline of the outer arms of the retainer body.

18. An anchoring retainer comprising:
    a base at a first axial end, the base having a threaded bore to receive a threaded fastener;
    a member spaced axially from said base, said member defining a bore for sliding on a threaded fastener, and at least a pair of arms connecting said base and said member;

there being means to assist in the bending movement of said arms to secure said retainer to a wall;

a pair of strips extending axially from said member, said strips being formed with at least two weakened points to assist in folding of said strips; and a first portion of said strip folds laterally outwardly and a second portion bends laterally inwardly from said first portion.

19. An anchoring retainer as recited in claim 3, wherein said relief also assists in folding of said arms for insertion into a hole, as well as during a fully assembled position.

20. An anchoring retainer as recited in claim 19, wherein said inner and outer arms fold between each other for insertion, and said relief facilitating easy folding, and also assisting in the abutting contact between said arms during the folding.

* * * * *